US010866821B2

United States Patent
Raffaele et al.

(10) Patent No.: US 10,866,821 B2
(45) Date of Patent: Dec. 15, 2020

(54) COMPUTER SYSTEMS, COMPUTER IMPLEMENTED METHODS AND COMPUTER EXECUTABLE CODE CONFIGURED TO PROVIDE SECURE PC SOLUTIONS BASED ON A VIRTUAL DESKTOP INFRASTRUCTURE (VDI), INCLUDING IPTV VIA VDI

(71) Applicant: Honeywell International Inc., Morris Plains, NJ (US)

(72) Inventors: Brodie Raffaele, Burswood (AU); George Michael Raffaele, Melville (AU)

(73) Assignee: Honeywell International Inc., Charlotte, NC (US)

( * ) Notice: Subject to any disclaimer, the term of this patent is extended or adjusted under 35 U.S.C. 154(b) by 158 days.

(21) Appl. No.: 16/103,740

(22) Filed: Aug. 14, 2018

(65) Prior Publication Data
US 2019/0050242 A1 Feb. 14, 2019

(51) Int. Cl.
*G06F 9/451* (2018.01)
*G06F 9/455* (2018.01)
(Continued)

(52) U.S. Cl.
CPC .......... *G06F 9/452* (2018.02); *G06F 9/45558* (2013.01); *G06F 21/57* (2013.01);
(Continued)

(58) Field of Classification Search
CPC ...... G06F 9/452; G06F 9/45558; G06F 21/57; G06F 2009/4557; G06F 2009/45579;
(Continued)

(56) References Cited

U.S. PATENT DOCUMENTS

| 2006/0037084 A1* | 2/2006 | Brown | G06F 21/85 726/28 |
| 2007/0186011 A1* | 8/2007 | Batke | H04L 41/0213 709/246 |

(Continued)

FOREIGN PATENT DOCUMENTS

CN 103118090 A 5/2013

OTHER PUBLICATIONS

Schonborg, Thomas (Disable Keyboard and Pointer), pp. 1-2. (Year: 2001).*

(Continued)

*Primary Examiner* — Emerson C Puente
*Assistant Examiner* — Jonathan R Labud
(74) *Attorney, Agent, or Firm* — Seaager Tufte & Wickhem LLP (57) ABSTRACT

The present invention relates to computer systems, computer implemented methods and computer executable code configured to provide secure PC solutions based on a virtual desktop infrastructure (VDI) including IPTV via VDI to secure locations such as prison cells. The invention is embodied in a networked system that provides a plurality of virtual machines that are hosted in a Virtual Environment, with data stored in a shared Storage Area Network (SAN). Secure application streaming technology is applied as a broker to deliver a secure user experience to the end users. The solution is based on providing a complete end-to-end solution delivering published apps to users on in-cell devices. The system is configured to provide functionalities including: (i) streaming of TV services to the cells via IPTV; and (ii) eLearning via the VDI environment.

15 Claims, 2 Drawing Sheets

| | | |
|---|---|---|
| (51) | Int. Cl. | |
| | *G06F 21/57* | (2013.01) |
| | *H04L 29/06* | (2006.01) |
| | *H04L 29/08* | (2006.01) |
| | *H04N 21/443* | (2011.01) |
| | *H04N 21/61* | (2011.01) |
| | *H04N 21/643* | (2011.01) |
| | *H04N 21/858* | (2011.01) |
| (52) | U.S. Cl. | |
| | CPC .......... *H04L 67/1097* (2013.01); *H04L 67/38* (2013.01); *H04N 21/4432* (2013.01); *H04N 21/4437* (2013.01); *H04N 21/6125* (2013.01); *H04N 21/64322* (2013.01); *H04N 21/8586* (2013.01); *G06F 2009/4557* (2013.01); *G06F 2009/45579* (2013.01); *G06F 2009/45587* (2013.01); *G06F 2221/2149* (2013.01) | |
| (58) | Field of Classification Search | |
| | CPC ... G06F 2009/45587; G06F 2221/2149; H04L 67/1097; H04L 67/38; H04N 21/4432; H04N 21/4473; H04N 21/6125; H04N 21/64322; H04N 21/8586 | |
| | See application file for complete search history. | |

(56) References Cited

U.S. PATENT DOCUMENTS

| | | |
|---|---|---|
| 2008/0228865 A1 | 9/2008 | Cruzada |
| 2012/0110131 A1 | 5/2012 | Villagas Nunez et al. |
| 2012/0230223 A1* | 9/2012 | Taguchi ............... H04L 12/4641 370/254 |
| 2013/0227564 A1* | 8/2013 | Asayama ............ G06F 9/45558 718/1 |
| 2014/0082052 A1 | 3/2014 | Kwon et al. |

OTHER PUBLICATIONS

"Optokon FTTH-Pon Solution: High quality equipment for installation of xPON passive optical networks," Optokon, 28 pages, Feb. 7, 2014.

"Hardened Security," PrisonPC: Secure Prisoner Interactive Learning System, 3 pages, 2018.

* cited by examiner

COMPUTER SYSTEMS, COMPUTER IMPLEMENTED METHODS AND COMPUTER EXECUTABLE CODE CONFIGURED TO PROVIDE SECURE PC SOLUTIONS BASED ON A VIRTUAL DESKTOP INFRASTRUCTURE (VDI), INCLUDING IPTV VIA VDI

The present application claims priority to Australian Patent Application No. 2017903244, filed Aug. 14, 2017, entitled, "Computer Systems, Computer Implemented Methods And Computer Executable Code Configured To Provide Secure PC Solutions Based On A Virtual Desktop Infrastructure (VDI), Including IPTV Via VDI," which is hereby incorporated by reference.

FIELD OF THE INVENTION

The present invention relates to computer systems, computer implemented methods and computer executable code configured to provide secure PC solutions based on a virtual desktop infrastructure (VDI) including IPTV via VDI.

The technology has been developed primarily for provision of computing infrastructure for users in sensitive environments (for example whilst incarcerated) and will be described hereinafter with reference to that application. However, the invention is not limited to that particular field and is more broadly applicable in other computing environments.

BACKGROUND

Any discussion of the background art throughout the specification should in no way be considered as an admission that such art is widely known or forms part of common general knowledge in the field.

In correctional facilities, there is a general objective to work towards rehabilitation of prisoners (and hence decrease the likelihood of re-offending). This is, in some cases, supported by providing the prisoners with training courses and videos to have them prepared for life outside the correctional facility. Traditionally, there are limitations on technology able to be used for such purposes, for example, due to various complications and risks associated with providing prisoners with access to computing devices. Traditionally, security for VDI has been addressed by using a thin client as a dumb terminal and only displaying a desktop. In such cases, processing power for rendering the desktop is provided by a remote server.

SUMMARY OF THE INVENTION

Example embodiments of the invention are provided in the claims below. Embodiments include devices and frameworks described herein (and aspects/elements thereof), methods described herein (and aspects/elements thereof) and computer program products and/or non-transitory carrier medium for carrying computer executable code that, when executed on a processor, causes the processor to perform a method as described herein.

One embodiment provides a system configured to provide functionality at a plurality of thin client terminals based on a virtual desktop infrastructure (VDI), the system including:

one or more virtual environment servers, which each provide a plurality of virtual machine instantiations via a networked environment;

one or more SAN storage devices, wherein each SAN storage device is coupled to at least one of the virtual environment servers via high speed network infrastructure; and a plurality of client terminals, wherein each client terminal is configured to execute a VDI client application that enables connection to at least one of the virtual environment servers, thereby to provide access to a respective virtual machine instantiation provided by the virtual environment server;

wherein the system is configured such that:

for each client terminal, BIOS is password protected and locked down to prevent a user of the client terminal from making any modifications to the BIOS;

for each client terminal, booting from USB devices is disabled within the BIOS; and for each client terminal, USB pass-through is disabled within the environment thereby to prevent the terminals from copying data in or out of the networked environment.

One embodiment provides a system including at least one administration terminal, not belonging to the plurality of client terminals, wherein the administration terminal is configured to enable administrator functions, wherein access to the administrator functions is not available via any of the client terminals.

One embodiment provides a system an IPTV application is deployed via the system, and wherein the IPTV application is configured thereby to prevent passing through of keyboard shortcuts from a given one of the client terminals to a given one of the servers.

One embodiment provides a system including a switch layer interposed between the client terminals and the one or more servers, wherein the switch layer includes one or more switch devices, and wherein each switch device is configured to apply a static MAC protocol such that switch ports are locked down based on the MAC address, and such that if there is an unauthorized device connected to a switch port, that port is automatically shut down.

One embodiment provides a system wherein a private VLAN is configured to disable communication between the client terminals.

One embodiment provides a system including an IPTV subsystem configured to:

receive one or more broadcast streams, and convert each of the one or more broadcast streams into a respective IPTV stream; and provide the one or more IPTV streams to a video redirection module, wherein the video redirection module is configured to broadcast each IPTV stream via a respective URL;

wherein an IPTV application is deployed via the system, such that each client module is configured to enable: identification of a URL for a desired IPTV stream; and accessing of the URL for that IPTV stream via the video redirection module thereby to access the respective URL and enable local rendering of the IPTV stream.

One embodiment provides a method configured to provide a system that delivers functionality at a plurality of thin client terminals based on a virtual desktop infrastructure (VDI), the method including:

providing one or more virtual environment servers, which each provide a plurality of virtual machine instantiations via a networked environment;

providing one or more SAN storage devices, wherein each SAN storage device is coupled to at least one or the virtual environment via high speed network infrastructure;

configuring a plurality of client terminals, such that each client terminal is configured to execute a VDI client application that enables connection to at least one of the virtual environment servers, thereby to provide access to a respective virtual machine instantiation provided by the virtual environment server;

wherein the system is configured such that:

for each client terminal, BIOS is password protected and locked down to prevent a user of the client terminal from making any modifications to the BIOS;

for each client terminal, booting from USB devices is disabled within the BIOS; and for each client terminal, USB pass-through is disabled within the environment thereby to prevent client terminals from copying data in or out of the networked environment.

One embodiment provides a method including providing at least one administration terminal, not belonging to the plurality of client terminals, wherein the administration terminal is configured to enable administrator functions, wherein access to the administrator functions is not available via any of the client terminals.

One embodiment provides a method wherein an IPTV application is deployed via the system, and wherein the IPTV application is configured thereby to prevent passing through of keyboard shortcuts from a given one of the client terminals to a given one of the servers.

One embodiment provides a method including a switch layer interposed between the client terminals and the one or more servers, wherein the switch layer includes one or more switch devices, and wherein each switch device is configured to apply a static MAC protocol such that switch ports are locked down based on the MAC address, and such that if there is an unauthorized device connected to a switch port, that port is automatically shut down.

One embodiment provides a method wherein a private VLAN is configured to disable communication between the client terminals.

One embodiment provides a method including providing IPTV functionality via the steps of:

receiving one or more broadcast streams, and convert each of the one or more broadcast streams into a respective IPTV stream;

providing the one or more IPTV streams to a video redirection module, wherein the video redirection module is configured to broadcast each IPTV stream via a respective URL; and deploying an IPTV application via the system, such that each client module is configured to enable: identification of a URL for a desired IPTV stream; and accessing of the URL for that IPTV stream via the video redirection module thereby to access the respective URL and enable local rendering of the IPTV stream.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which.

DETAILED DESCRIPTION

The present invention relates to computer systems, computer implemented methods and computer executable code configured to provide secure PC solutions based on a virtual desktop infrastructure (VDI) with IPTV. The technology has been developed primarily for provision of computing infrastructure for users in sensitive environments (for example whilst incarcerated). However, it will be appreciated that the technology, whilst described by reference to example implementation in a correctional facility, has broader application.

Described herein is a secure "in-cell" PC solution based on a Virtual Desktop Infrastructure (VDI). VDI is virtualisation technology that hosts a desktop operating system on a centralised virtual environment. VDI is a variation on the client-server computing model, sometimes referred to as server-based computing.

The solution is embodied in a networked system that provides a plurality of virtual machines that are hosted in a Virtual Environment, with data stored in a shared Storage Area Network (SAN). Secure application streaming technology is applied as a broker to deliver a secure user experience to the end users. The solution is based on providing a complete end-to-end solution delivering published apps to users on, which in this example make use of, WYSE thin client endpoint devices as in-cell devices. The system is configured to provide functionalities including: (i) streaming of TV services to the cells via IPTV; and (ii) eLearning via the VDI environment.

Figure 1:
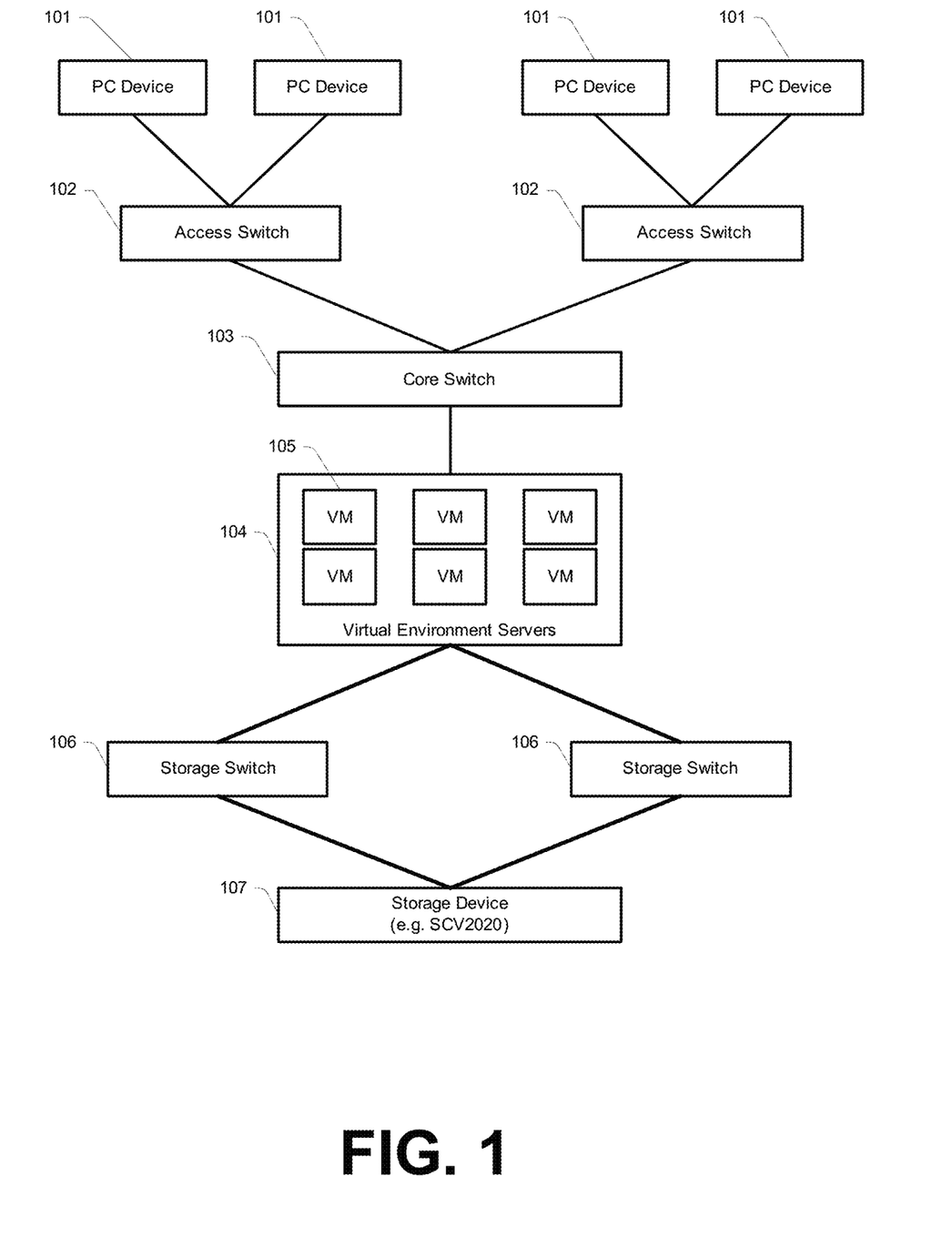
FIG. 1 illustrates a computer framework according to one embodiment.

Referring to FIG. 1, the system includes one or more virtual environment servers 105, which each provide a plurality of virtual machine instantiations 105. One or more SAN storage devices 107 are provided. Each storage device 107 is coupled to server 104 via one or more SAN switches 106. Coupling between server 105 and switches 106, and between switches 106 and SAN storage device 107, is achieved via high speed infrastructure, for example 10 GbE connections. This arrangement supports a plurality of client PCs 101, which connect to server 104 via one or more switches (for example, as shown in FIG. 1, access switches 102 and a core switch 103. The client PCs are thin client devices, for example all in one zero client terminals.

In providing the VDI system, servers 104 include servers running the Virtual Environment platform. A VDI cluster hosts virtual servers that are used to run the VDI servers with applications such as IPTV and other applications. A management cluster hosts virtual servers consisting of all management servers such as active directory, backup, antivirus and backend servers. VDI hosts connect to the storage device 107 using 10G iSCSI connections for storage access.

As mentioned, traditional VDI systems utilise servers to provide processing for the rendering of content at the remote terminals. The inventors have identified that this method does not scale well with increased terminals as the processing power required of the servers quickly becomes unmanageable. The scalability problem of the traditional systems is addressed by shifting the processing load of the content rendering to the terminal PCs 101 thereby reducing the processing power required of servers 104. In this embodiment of the subject invention, PCs 101 are defined by WYSE all-in-one thin client with respective inbuilt displays. ThinOS, an operating system specifically designed for virtual environment is used to connect to the virtual desktop.

The VDI environment is configured with multiple levels of security at both the physical and the software layer. In one embodiment, a secured system is provided by configuring server 104 using specific software settings and applying specific BIOS settings on client PCs 101. The software settings used to configure the server 104 includes restricting permissions and functionality on the client PCs 101. In the present example, security features include:

Shortened 300 mm cables are be deployed for keyboard, Mouse and power cables.

BIOS access on the thin client is password protected and locked down to prevent a user of the PC from making any modifications to the BIOS. This is centrally managed by the Device Manager module provided by the WYSE platform.

Booting from USB devices is disabled within the BIOS. In the event that a bootable USB or any mass storage devices is plugged in, the device details are logged and the device is not visible to the PC.

USB pass-through is disabled within the environment as a second layer of defence to prevent PCs from copying data in or out of the environment. This means that only the mouse and keyboard can connect, and no storage device can be used.

Admin access within the thin client is completely disabled for security reasons. All administration of the thin client is performed via a centralised management console.

An IPTV application is deployed, having inbuilt security which stops keyboard shortcuts passing through to the desktop session. The IPTV application decodes the IPTV stream from the IPTV server and presents it in a window with menus to change the volume and the channel. To view in full-screen mode, user clicks on the screen.

Static MAC is configured at the switch layer to prevent user from plugging in their own devices. The switch ports are locked down based on the MAC address, such that if there is an unauthorised device plugged in, the port will automatically be shut down and manual intervention from an admin staff will be required to turn it back on.

Private VLAN is configured to disable communication between the PCs. The PCs are permitted only to communicate with the management hosts.

As indicated above, a management console is provided. The purpose of the management console is for administrator users (for example prison staff) to:

Set a curfew for various services available to the PCs.
Restrict television content made available via IPTV.
Monitor prison PC's activities.
Review alerts and logs.
Restrict software usage by users.
Send messages to all and/or individual prisoners.
Monitor network and PC usage.
Console to other management portals for E-Learning and other applications.

A key component of the system relates to technology for enabling the video rendering for IPTV in a VDI architecture. In a traditional VDI architecture all processing power is required centrally, and the only thing pushed to the thin client PC is the display. Given the large quantity of end-client PCs that are likely to be deployed in a correctional facility (for example 1,000 or more) it would take considerable central processing power to render 1,000 or more IPTV streams simultaneously. In this regard, the present system is configured to offload the processing requirements to the thin client PC's in the field, allowing a much smaller processing footprint and cost centrally.

Figure 2:
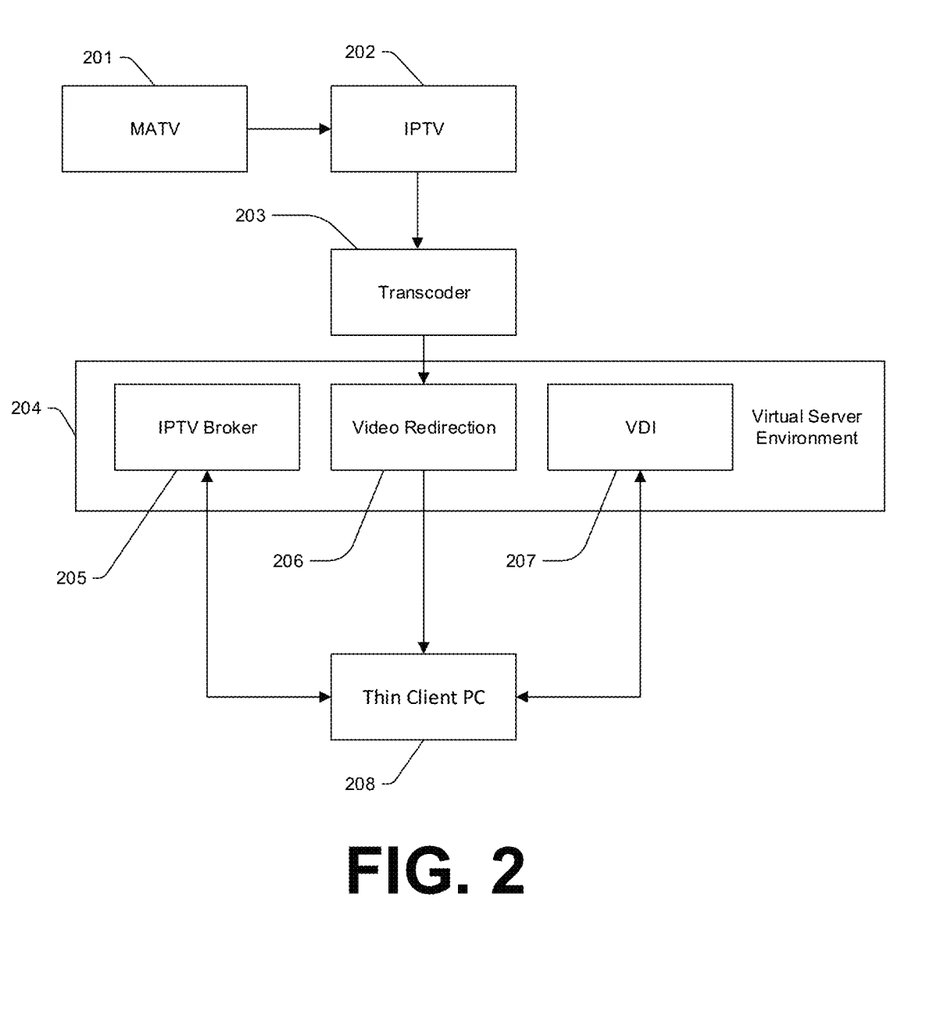
FIG. 2 illustrates a method according to one embodiment.

Referring to FIG. 2, one embodiment makes use of IPTV technology including a Master Antenna Television (MATV) headend, which receives terrestrial TV broadcast (DVB-T) or satellite broadcast (DVB-S), and converts channels into IPTV streams 202. The IPTV streams are, in this example, encoded in a native format in which they are broadcast. A Transcoder module 203 is configured to process IPTV streams 202 received from MATV headend 201, and converts those streams into an alternate form, which in this embodiment is defined by a H.264 stream format. The transcoder provides the converted streams to a video redirection module provided via virtual environment server 204 (which provides a virtual desktop infrastructure (VDI) module 207 configured to enable VDI functionality at a thin client PC 208. This allows for a multimedia redirection process, whereby the a thin client IPTV application executing on thin client PC 208 communicates with an IPTV Broker module, which provides an IP address and port of the stream from the video redirection module. Each IPTV stream is broadcast on a different URL.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components.

The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A computer system configured to provide functionality at a plurality of client terminals based on a virtual desktop infrastructure (VDI), the system including:
    one or more virtual environment servers, which each provide a plurality of virtual machine instantiations via a networked environment;
    one or more SAN storage devices, wherein each SAN storage device is coupled to at least one of the virtual environment servers via high speed network infrastructure; and
    a plurality of client terminals, wherein each client terminal is configured to execute a VDI client application that enables connection to at least one of the virtual environment servers, thereby to provide access to a respective virtual machine instantiation provided by the virtual environment server;
    wherein the system is configured such that:
        for each client terminal, BIOS is password protected and locked down to prevent a user of the client terminal from making any modifications to the BIOS;
        for each client terminal, booting from USB devices is disabled within the BIOS; and
        for each client terminal, USB pass-through is disabled within the environment thereby to prevent client terminals from copying data in or out of the networked environment; and
    wherein an IPTV application is deployed via the system, and wherein the IPTV application is configured thereby to prevent passing through of keyboard shortcuts from a given one of the client terminals to a given one of the servers.

2. The system according to claim 1 including at least one administration terminal, not belonging to the plurality of client terminals, wherein the administration terminal is configured to enable administrator functions, wherein access to the administrator functions is not available via any of the client terminals.

3. The system according to claim 1 including a switch layer interposed between the client terminals and the one or more servers, wherein the switch layer includes one or more switch devices, and wherein each switch device is configured to apply a static MAC protocol such that switch ports are locked down based on the MAC address, and such that if there is an unauthorized device connected to a switch port, that port is automatically shut down.

4. The system according to claim 1 wherein a private VLAN is configured to disable communication between the client terminals.

5. The system according to claim 1, including an IPTV subsystem configured to:
    receive one or more broadcast streams, and convert each of the one or more broadcast streams into a respective IPTV stream; and
    provide the one or more IPTV streams to a video redirection module, wherein the video redirection module is configured to broadcast each IPTV stream via a respective URL;
    wherein an IPTV application is deployed via the system, such that each client terminal is configured to enable:
        identification of a URL for a desired IPTV stream; and
        accessing of the URL for that IPTV stream via the video redirection module thereby to access the respective URL and enable local rendering of the IPTV stream.

6. A method configured to provide a system that delivers functionality at a plurality of thin client terminals based on a virtual desktop infrastructure (VDI), the method including the steps of:

provide one or more virtual environment servers, which each provide a plurality of virtual machine instantiations via a networked environment;

providing one or more SAN storage devices, wherein each SAN storage device is coupled to at least one of the virtual environment servers via high speed network infrastructure;

configuring a plurality of client terminals, such that each client terminal is configured to execute a VDI client application that enables connection to at least one of the virtual environment servers, thereby to provide access to a respective virtual machine instantiation provided by the virtual environment server;

configuring the system such that:

for each client terminal, BIOS is password protected and locked down to prevent a user of the client terminal from making any modifications to the BIOS;

for each client terminal, booting from USB devices is disabled within the BIOS; and for each client terminal, USB pass-through is disabled within the environment thereby to prevent the terminal from copying data in or out of the networked environment; and deploying an IPTV application via the system, and wherein the IPTV application is configured thereby to prevent passing through of keyboard shortcuts from a given one of the client terminals to a given one of the servers.

7. The method according to claim 6 including the step of providing at least one administration terminal, not belonging to the plurality of client terminals, wherein the administration terminal is configured to enable administrator functions, wherein access to the administrator functions is not available via any of the client terminals.

8. The method according to claim 6 including the step of interposing a switch layer between the client terminals and the one or more servers, wherein the switch layer includes one or more switch devices, and wherein each switch device is configured to apply a static MAC protocol such that switch ports are locked down based on the MAC address, and such that if there is an unauthorized device connected to a switch port, that port is automatically shut down.

9. The method according to claim 6 wherein a private VLAN is configured to disable communication between the client terminals.

10. The method according to claim 6 including providing IPTV functionality via the steps of:

receiving one or more broadcast streams, and converting each of the one or more broadcast streams into a respective IPTV stream;

providing the one or more IPTV streams to a video redirection module, wherein the video redirection module is configured to broadcast each IPTV stream via a respective URL; and deploying an IPTV application via the system, such that each client terminal is configured to enable:

identification of a URL for a desired IPTV stream; and accessing of the URL for that IPTV stream via the video redirection module thereby to access the respective URL and enable local rendering of the IPTV stream.

11. A method configured to provide a system that delivers functionality at a plurality of client terminals based on a virtual desktop infrastructure (VDI), the method including the steps of:

providing one or more virtual environment servers, which each provide a plurality of virtual machine instantiations via a networked environment;

providing one or more SAN storage devices, wherein each SAN storage device is coupled to at least one of the virtual environment servers via high speed network infrastructure;

configuring a plurality of client terminals, such that each client terminal is configured to execute a VDI client application that enables connection to at least one of the virtual environment servers, thereby to provide access to a respective virtual machine instantiation provided by the virtual environment server;

configuring the system such that:

for each client terminal, BIOS is password protected and locked down to prevent a user of the client terminal from making any modifications to the BIOS;

for each client terminal, booting from USB devices is disabled within the BIOS;

for each client terminal, USB pass-through is disabled within the environment thereby to prevent the terminal from copying data in or out of the networked environment;

providing IPTV functionality that includes:

receiving one or more broadcast streams, and converting each of the one or more broadcast streams into a respective IPTV stream;

providing the one or more IPTV streams to a video redirection module, wherein the video redirection module is configured to broadcast each IPTV stream via a respective URL; and deploying an IPTV application via the system, such that each client terminal is configured to enable:

identification of a URL for a desired IPTV stream; and accessing of the URL for that IPTV stream via the video redirection module thereby to access the respective URL and enable local rendering of the IPTV stream.

12. The method according to claim 11 including the step of providing at least one administration terminal, not belonging to the plurality of client terminals, wherein the administration terminal is configured to enable administrator functions, wherein access to the administrator functions is not available via any of the client terminals.

13. The method according to claim 11 including the step of deploying an IPTV application via the system, and wherein the IPTV application is configured thereby to prevent passing through of keyboard shortcuts from a given one of the client terminals to a given one of the servers.

14. The method according to claim 11 including the step of interposing a switch layer between the client terminals and the one or more servers, wherein the switch layer includes one or more switch devices, and wherein each switch device is configured to apply a static MAC protocol such that switch ports are locked down based on the MAC address, and such that if there is an unauthorized device connected to a switch port, that port is automatically shut down.

15. The method according to claim 11 wherein a private VLAN is configured to disable communication between the client terminals.

\* \* \* \* \*